United States Patent [19]

Hamer et al.

[11] Patent Number: 4,794,584
[45] Date of Patent: Dec. 27, 1988

[54] METHOD AND APPARATUS FOR SCANNING THE RECORDING SURFACE OF A ROTATING DISC-SHAPED RECORD CARRIER

[75] Inventors: René Hamer; Johannes H. T. Pasman, both of Eindhoven, Netherlands

[73] Assignee: U.S. Philips Corporation, New York, N.Y.

[21] Appl. No.: 916,248

[22] Filed: Oct. 7, 1986

[30] Foreign Application Priority Data

Apr. 21, 1986 [NL] Netherlands ................. 8601006

[51] Int. Cl.$^4$ ............................................. G11B 7/00
[52] U.S. Cl. ..................................... 369/44; 369/57; 369/58; 369/111; 369/50
[58] Field of Search ................. 358/342; 369/99, 107, 369/109, 111, 119, 50, 53–57, 43–46, 58

[56] References Cited

U.S. PATENT DOCUMENTS

| | | |
|---|---|---|
| 3,894,179 | 7/1975 | Jacobs et al. |
| 3,908,076 | 9/1975 | Broadbent |
| 4,198,657 | 4/1980 | Kanamara ............... 369/111 X |
| 4,223,347 | 9/1980 | Bouwhuis et al. |
| 4,577,301 | 3/1986 | Mathews et al. ............ 369/111 X |

FOREIGN PATENT DOCUMENTS 2312087 12/1976 France .
60-256926 12/1985 Japan .

Primary Examiner—Robert L. Richardson
Attorney, Agent, or Firm—Algy Tamoshunas

[57] ABSTRACT

A method and apparatus for scanning a plurality of concentric or spiral tracks on the surface of a rotating disc-shaped record carrier with a beam of radiation which may be modulated with information to be recorded on such surface. The beam is produced by an optical head and is directed at a target point on the record carrier by a positioning device and a deflection device, the positioning device radially displacing the optical head and the deflection device radially deflecting the radiation beam produced by the optical head. The composite resultant motion of the target point on the carrier is in a radial direction and includes a non-reversing component produced by the positioning device and a reciprocating component produced by the deflection device. Since the reciprocal motion occurs only over the small distance between successive tracks, accurate low-vibration radial motion of the target point is achieved, enabling information to be rapidly and accurately recorded on respective spiral or concentric tracks by means of single-spot radiation beam.

9 Claims, 6 Drawing Sheets

METHOD AND APPARATUS FOR SCANNING THE RECORDING SURFACE OF A ROTATING DISC-SHAPED RECORD CARRIER

BACKGROUND OF THE INVENTION

1. Field of the Invention

The invention relates to a method of scanning a radiation-sensitive recording surface of a rotating disc-shaped carrier along pedetermined concentric or spiral paths by means of a modulated radiation beam which is aimed at a target point on the record carrier, the target point being moved over the recording surface in a radial direction in accordance with a predetermined motion by positioning and beam deflecting means of a first.

The invention also relates to optical write apparatus for carrying out such method, comprising a drive means for rotating a disc-shaped carrier having a radiation sensitive recording surface, an optical system for aiming a radiation beam at a target point on the recording surface, and a positioning device for moving the target point across the recording surface in a radial direction within a first displacement range under control of a control device.

2. Description of the Related Art

Such a method and apparatus are known from Netherlands Patent Application No. 72 12 045 and the corresponding U.S. Pat. No. 3,894,179, issued July 8, 1975. Said Application patent describes a method and apparatus for the manufacture of master discs for making copies of optically readable record carriers. In accordance with said method a disc-shaped carrier having a recording surface formed by a photoresist layer is rotated by a drive means. As the carrier is rotated it is scanned by a laser beam which is aimed at a spot on the photoresist layer by the optical system. The drive means is arranged on a slide which moves it in such a way that the target point of the laser beam on the photoresist is radially moved over a displacement range of the order of magnitude of the radius of the disc-shaped carrier. As a result of the rotation of the carrier and the continuous radial displacement of the landing point of the laser beam the photoresist layer is scanned along a spiral path, the laser beam being digitally modulated in accordance with an on-off pattern determined by the information to be recorded. After the photoresist has been developed and the carrier has been subjected to a photo-etching process, a master disc with an information structure arranged along a spiral track is obtained which can be used for making copies.

The known method and apparatus have the disadvantage that they are less suitable for the manufacture of master discs for optically readable record carriers provided with a multiple spiral, for example record carriers formed with a spiral groove between which a spiral information track is arranged. By means of the known method and apparatus a disc having such a multiple spiral can be obtained only by first scanning the recording surface along one of the sub-spirals (for example the sub-spiral defined by the groove) and subsequently scanning the recording surface along the other sub-sprial defined by the information track, which requires a reversal of the radial direction of movement. As a result of hysteresis, which is caused by backlash and the like resulting from the direction reversal in the positioning device an accurate positioning of the starting point of each scan of the second sub-spiral between the turns of the first sub-spiral already scanned is not possible.

This presents a serious problem, in particlar, in the manufacture of masters, where extemely stringent requirements are imposed on the positional accuracy ($\pm 20.10^{-9}$ m) of the second sub-spiral relative to the first sub-spiral.

Moreover, in the manufacture of master discs for record carriers having a structure arranged along concentric tracks the known method and apparatus have the drawback that during radial positioning undesired vibrations arise as a result of the inevitable changes in slide velocity which occur when changing over from one concentric path to another. These undesired vibrations make it necessary to allow some extra waiting time before changing to another concentric path to allow the vibrations to be damped out sufficiently before recording can be resumed.

SUMMARY OF THE INVENTION

It is the obejct of the invention to provide a method and apparatus for scanning a disc-shaped record carrier which mitigates the aforementioned drawbacks.

The method in accordance with the invention employs the above-described positioning device and also a deflection device in order to obtain a composite motion of the target point, of the laser beam, which motion has a first and second radial motion components produced by the positioning and deflection devices respectively, such devices being controlled in such a way that the first motion component is a predetermined motion in a direction which does not reverse and the second motion component is a predetermined reciprocating motion.

Optical write apparatus in accordance with the invention comprises the aforesaid deflection device for radially moving the target point over the recording surface within a second displacement range smaller than the displacement range producing by the positioning device, both devices being under control of a control device adapted to control the first and the second radial motion components produced by the positioning device and the deflection device in conformity with a first and a second predetermined motion profile, respectively.

The invention is inter alia based on the recognition of the fact that scanning along concentric paths or multiple spirals is possible by moving the target point so that it has a non-reversing motion component and a reciprocating motion component over a limited displacement range.

Scanning along a multiple spiral (for example a two-fold spiral) is possible by controlling the position of the target point so that parts of one sub-spiral and parts of the other sub-spiral are alternately scanned. After scanning a limited number of turns of one sub-spiral, the target point is returned to the previous point where scanning of the other sub-spiral had been discontinued.

Scanning along concentric paths is possible by compensating for the continuous motion component by the reciprocating motion component in such a way that the radial position of the target point during each path remains constant. After scanning of one complete path the direction of the reciprocating motion component is reversed until the radial position required for the next path is reached, after which this next path can be scanned.

The invention is further based on the recognition of the fact that an accurate movement will be obtained because the non-reversing continuous motion component ensures that hysteresis in the positioning device, which is difficult to keep within specified tolerances on account of the large displacement range, has no influence on its accuracy of the target point position. Moreover, a non-reversing motion produces less undesired vibrations. The reversal of the direction of the target point, which is inevitable when scanning along multiple-spirals, is provided by a deflection device having a small displacement range. In the case of a deflection device having a small displacement range the hysteresis upon direction reversal can be kept within required tolerances in a comparatively simple manner. Moreover, the undesired vibrations causes by the limited reciprocating motion are smaller.

A method in accordance with the invention of scanning the recording surface along concentric paths is characterized in that the first motion component is at a substantially constant velocity, and during portions of the second motion component it compensates for the first motion component so that the radial position of the target point for each path remains constant, the duraction of each such portion corresponding to at least one revolution of the disc-shaped carrier.

Since the positioning device need only generate a constant-velocity motion it produces hardly any undesired vibrations. Undesired vibrations in the motion of the target point are therefore of comparatively low amplitude, caused only be the deflection device within a limited displacement range.

A method in accordance with the invention of scanning the recording surface along an n-fold spiral (n being an integer) is characterized in that the duration of one period of the reciprocating second motion component substantially corresponds to p revolutions, p being an integer larger than or equal to 1, the velocities of the first and the second motion components during forward portions of the second motion component being selected in such a way that the velocity of the composite motion of the target spot is substantially proportional to the angular velocity of the record carrier during an uninterrupted time interval of at least q revolutions, q being an integer smaller than or equal to p. The target point is moved in a radial direction over a distance substantially corresponding to 1/n times the pitch of the n-fold spiral during one full period of the reciprocating motion component. This ensures that during each successive forward motion q turns of one of the sub-spiral are scanned. The resulting accuracy of target point position is mainly limited by the comparatively small inaccuracy of the deflection device within its limited displacement range.

In one embodiment the optical write apparatus is characterized in that the deflection device is an acousto-optical modulator for deflecting the radiation beam which is aimed at the recording surface.

The absence of mechanical components in an acousto-optical modulator results in a very accurate and almost vibration-free reciprocating motion.

BRIEF DESCRIPTION OF THE DRAWINGS

Embodiments of the invention will now be described in more detail, by way of example, with reference to FIGS. 1 to 8, of which

DESCRIPTION OF THE PREFERRED EMBODIMENT

Figure 1:
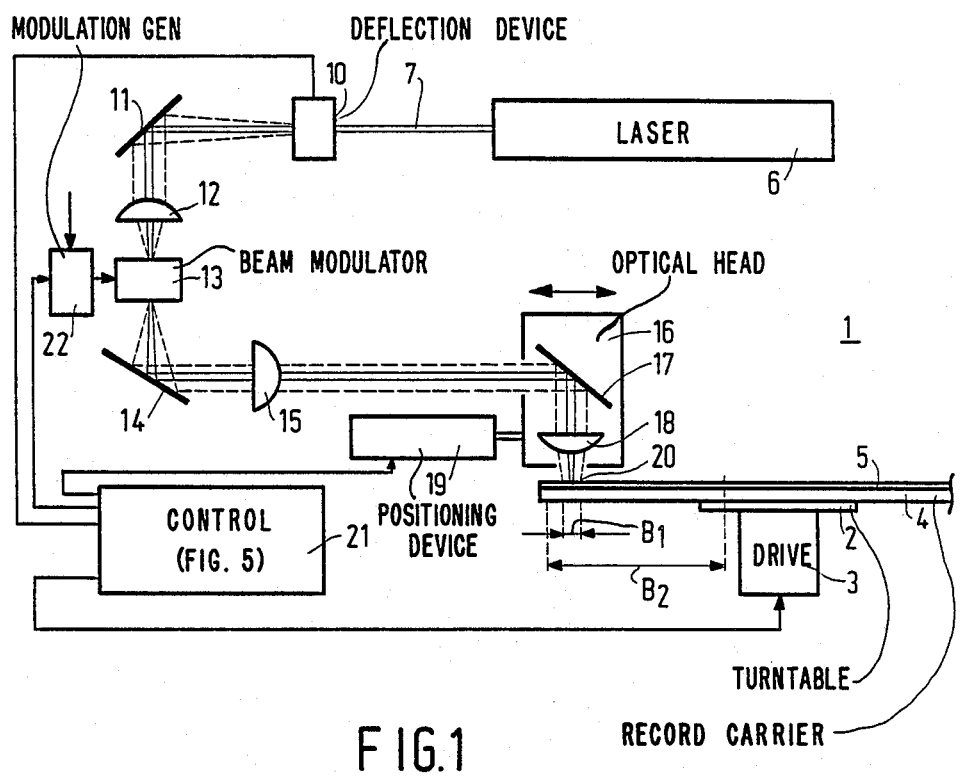
FIG. 1 shows an optical write apparatus in accordance with the invention.

FIG. 1 shows an optical write apparatus 1 in accordance with the invention. The write apparatus 1 comprises a turntable 2 which is rotated by a drive means 3. A disc-shaped record carrier 4 provided with a light-sensitive layer 5, for example a photo-resist layer, can be placed on the turntable 2.

A laser 6 emits a light beam 7 which is projected onto the light-sensitive layer 5. The light beam 7 is first passed through a deflection device 10. The deflection device 10 is of a type by means of which a light beam can be deflected very accurately within a small range. Suitably, it may be an acousto-optical modulator. However, it is also possible to use other deflection devices, such as for example a mirror which is pivotable through a small angle. The limits of the deflection range are indicated in broken lines in FIG. 1. The light beam 7 deflected by the deflection device 10 is directed to an optical head 16 via a mirror 11, a lens 12, a modulation device 13 for modulating the light beam 7, a mirror 14 and a lens 15. The optical head comprises a mirror 17 and an objective 18 for focussing the light beam on the light-sensitive layer 5. The optical head is radially movable reltive to the rotating carrier 4 by means of a positioning device 19.

By means of the above optical system the light beam 7 is aimed at a target point 20 on the light-sensitive layer 5, the position of this target point 20 being determined by the magnitude of the deflection of the light beam 7 produced by the deflection device 10 and the radial position of the write head 16 relative to the carrier 4. In any position of the optical head 16, the target point 20 can be moved by means of the deflection device 10 the target point can be moved over a larger range designated B2 by positioning device 19 by moving the optical head 16. Further, the optical write apparatus comprises a modulation generator 22 for generating a modulation signal for the beam modulation device 13. Moreover, the optical write apparatus 1 comprises a control device 21 which, for controlling the motion of the target point 20, is coupled to the deflection device 10, the optical head positioning device 19 and the modulation generator 22 in order to synchronize the modulation signal with the motion of the target point 20 over the light-sensitive layer 5.

By means of the optical write apparatus 1 the photo-resist layer 5 can be scanned with the light beam 7 along a multiple spiral, so that information can be recorded alaong a multiple spiral.

Figure 2:
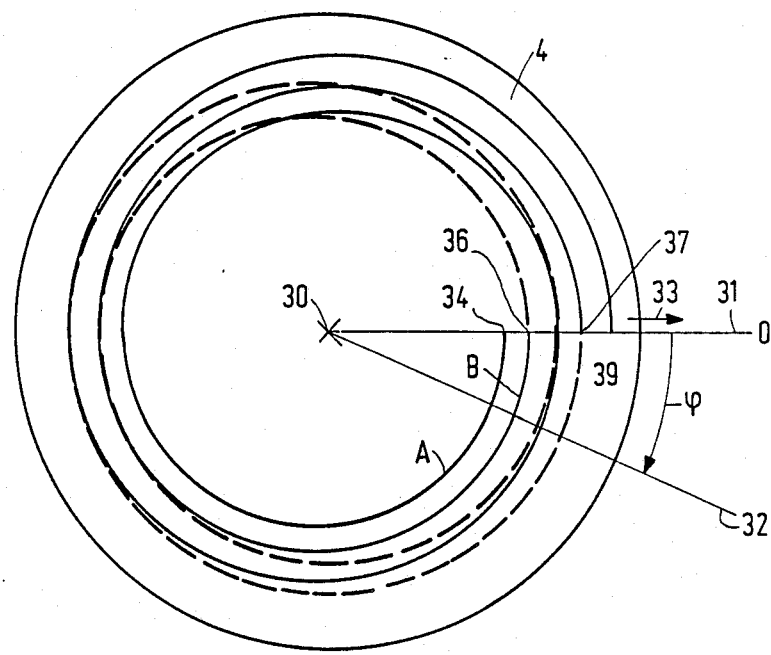
FIGS. 2, 3 and 4 show a number of paths described by the target point to explain the invention method.
Figure 2A:
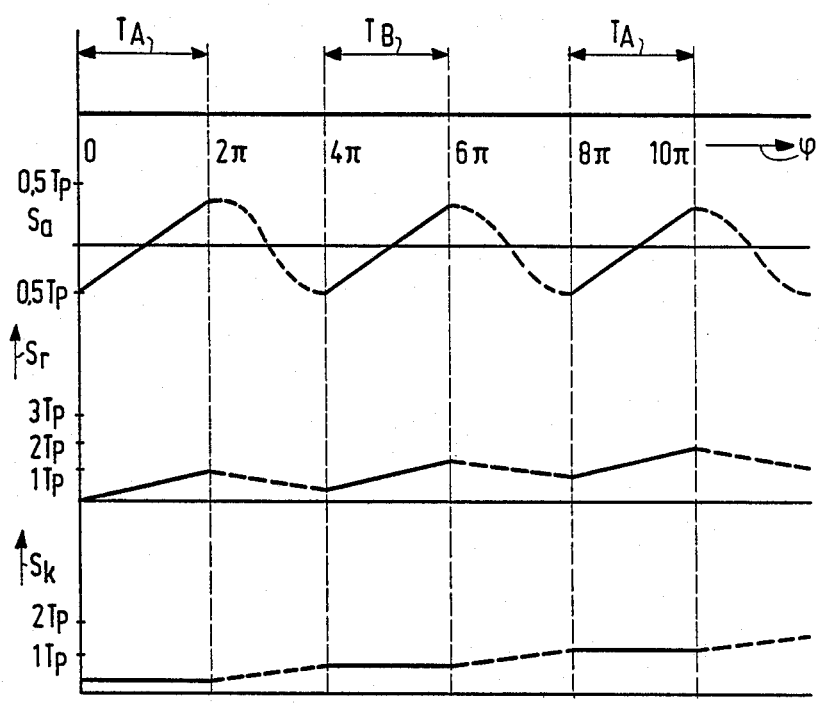
FIGS. 2a, 3a, 4a represent the motion components produced by the positioning and deflection devices and the target-point motion of the composite of these components as a function of the angular displacement of the record carrier.

FIG. 2 shows an example of the path which may be described by the target point 20. The centre of rotation about which the disc-shaped carrier 4 is rotated is indicated by the reference numeral 30. The path which may be followed by the target point 20 of the optical beam in a radial direction is designated 31. The angle between the path 31 and a radius 32 issuing from the centre of rotation 30 and situated on the record carrier 4 is designated $\phi$. The sub-spirals A and B together constitute a double spiral along which the information to be recorded is to be arranged. During a first revolution of the carrier 4 ($0<\phi<2\pi$) the target point is moved from a starting position 34 in the radial direction indicated by the arrow 33 with a velocity proportional to the circumferential velocity of the carrier 4, so that the target point 20 follows the first sub-spiral path A on the carrier 4. In FIG. 2a the corresponding radial displacement Sr is plotted as a function of 100. After one revolution the target point has reached a position 35, after which the direction of movement of the target point 20 is reversed and it is returned at a lower velocity over a distance corresponding to half the track pitch Tp during the second revolution of the carrier ($2\pi<\phi<4\pi$). Consequently, at the end of the second revolution the target point 30 has reached a position 36. Subsequently, during the next revolution ($4\pi<\phi<6\pi$) the target point 20 is again moved in the direction indicated by the arrow 33 with the original velocity proportional to the angular velocity of the record carrier, so that the light-sensitive layer 5 of the carrier 4 is scanned along the first turn of the second sub-spiral B.

When the target point 20 has reached the end 37 of the first turn of the second sub-spiral B, the target point is again returned in the reverse radial direction at a lower velocity during one revolution ($6\pi<\phi<8\pi$) until position 35 is reached. Scanning is then resumed in the forward radial direction along the second turn of the first sub-spiral A. In this way the photoresist layer 5 is scanned alternately along the turns of the sub-spiral A and the turns of the sub-spiral B, the light beam 7 being modulated in conformity with the information to be recorded during the time intervals TA and TB (in which the photoresist layer is scanned along the sub-spiral A and the sub-spiral B respectively). During each time interval in which the target point is moved from one sub-spiral to an other (indicated by broken lines in FIG. 2), the light beam 7 is interrupted by the modulation device 13, so that no recording is effected. It will be appreciated that for moving the target point from one sub-spiral to another sub-spiral any path is permissible whose end point corresponds to the desired starting point of the next scan. The radial displacement Sr has a displacement component Sk produced by the positioning device 19 and a larger displacement component Sa produced by the deflection device 10. In FIG. 2a Sk and Sa are also plotted as a function of $\phi$. As is apparent from FIG. 2a, the target point 20 performs a radial motion which is composed of a motion component whose direction is not reversed and which is determined by the small variation of the displacement component Sk, and of a reciprocating motion component which is determined by the variation of the displacement component Sa.

Since the direction of the motion component produced by the positioning device 19 is not reversed hysteresis in the optical head positioning device 19 does not affect the positioning accuracy of the target point 20. The reversal of the direction of the radial motion of the target point 20, which is necessary for scanning a double spiral, is obtained by means of the reciprocating motion component produced by the deflection device 10. Since the range B1 of the deflection device 10 is small relative to the displacement range B2 of the optical head, the inaccuracy caused by hysteresis is much easier to be kept within the required tolerances for the deflection device 10, thus ensuring an accurate positioning of the target point 20. When an acousto-optical deflection device is employed a very accurate positioning is possible owing to the absence of mechanical components.

Moreover, the use of an acousto-optical deflection device enables very rapid radical displacements of the target point 20 to be obtained, so that after scanning one turn of a sub-spiral it is possible to return almost immediately to the point where scanning of the other spiral was interrupted. The path described by the target point and the associated variation of Sr, Sa and Sk are illustrated in FIG. 3 and FIG. 3a, respectively, for the case in which the deflection device 10 in FIG. 1 is an acoustic-optical device.

Figure 3:
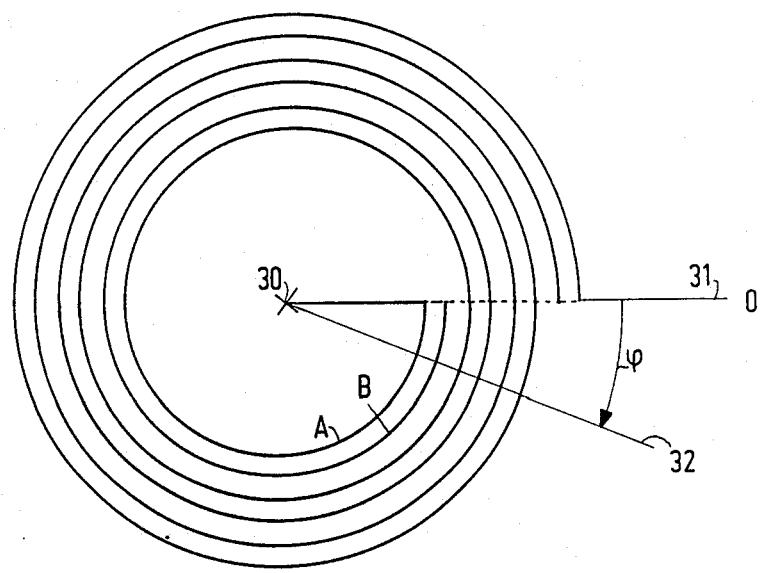
Figure 3A:
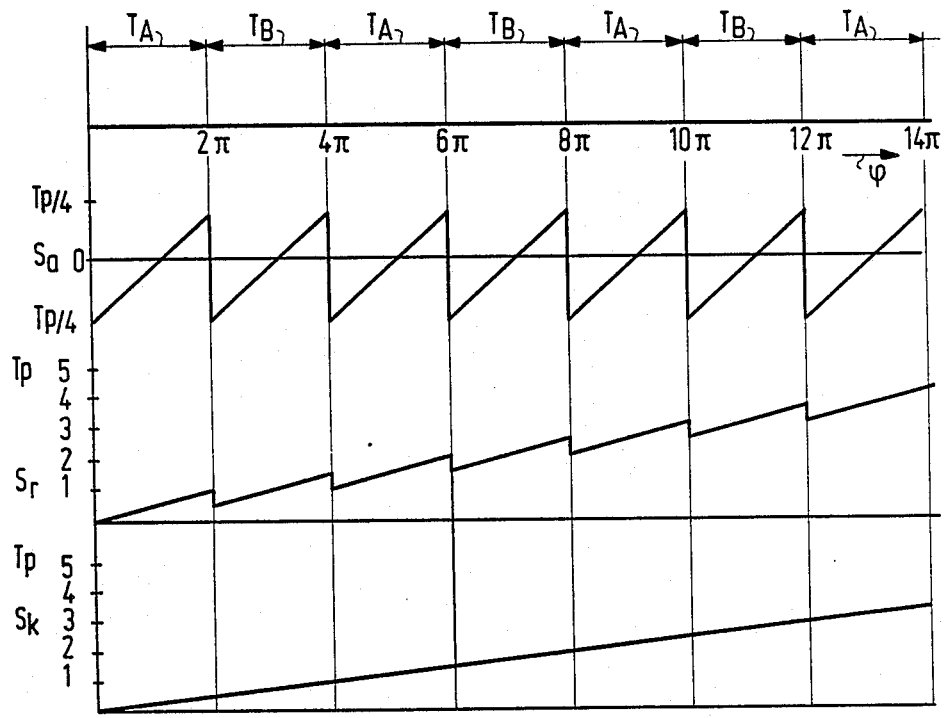

The path followed by the target point 20 when changing over from scanning one spiral to scanning of the other spiral is represented in broken lines in FIG. 3. Since the radial displacement of the target point cannot be reversed in an infinitely short time the turns of each of the sub-spirals will not be entirely contiguous. However, these errors are so small that this presents no problem for most uses.

In the foregoing scanning along a two-fold spiral has been illustrated. However, it will be evident to those skilled in the art that in the similar way scanning along a multiple spiral comprising more than two sub-spirals can be effected.

In the scanning method described above with reference to FIGS. 2 and 2a the radial position of the target point 20 is controlled in such a way that in alternate revolutions of the record carrier portions of one sub-spiral and portions of the other sub-spiral are scanned, the target point, after scanning of a portion of one sub-spiral, returning during the next revolution to the point where scanning of the other sub-spiral was interrupted. In the present example, shown in FIGS. 3 and 3a, the lengths of the alternately scanned portions of each of the sub-spirals each correspond to the length of one revolution with no intermediate revolution of the record carrier. It will be appreciated that, in principle, any arbitrary length is permissible, provided that when the scanning of one sub-spiral is interrupted scanning is resumed at the point where the scanning of the other sub-spiral was interrupted.

Further, it will be evident that Sa and Sk can be varied in numerous ways. In this respect it is only important that the displacement of the target point proceeds in a desired manner and that the direction of the motion component determined by Sk is not reversed. An accurate radial motion of the target point 20 is then always guaranteed.

Figure 4:
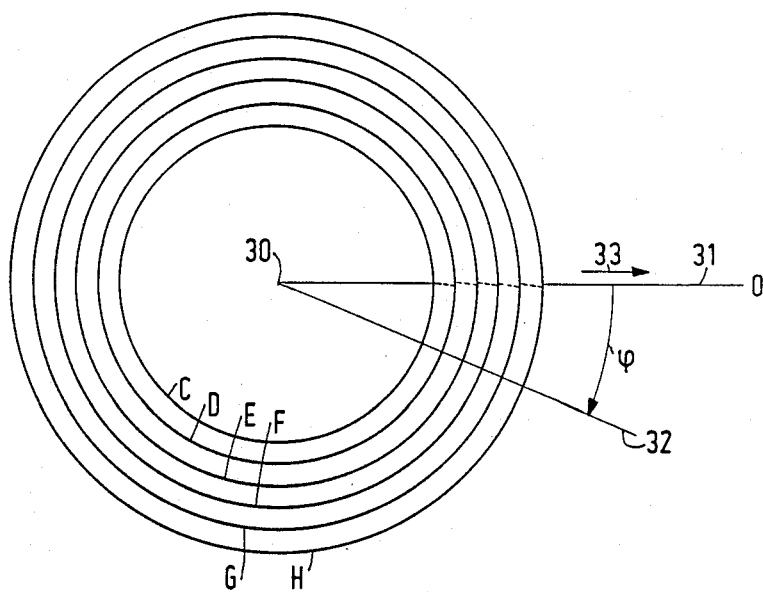
Figure 4A:
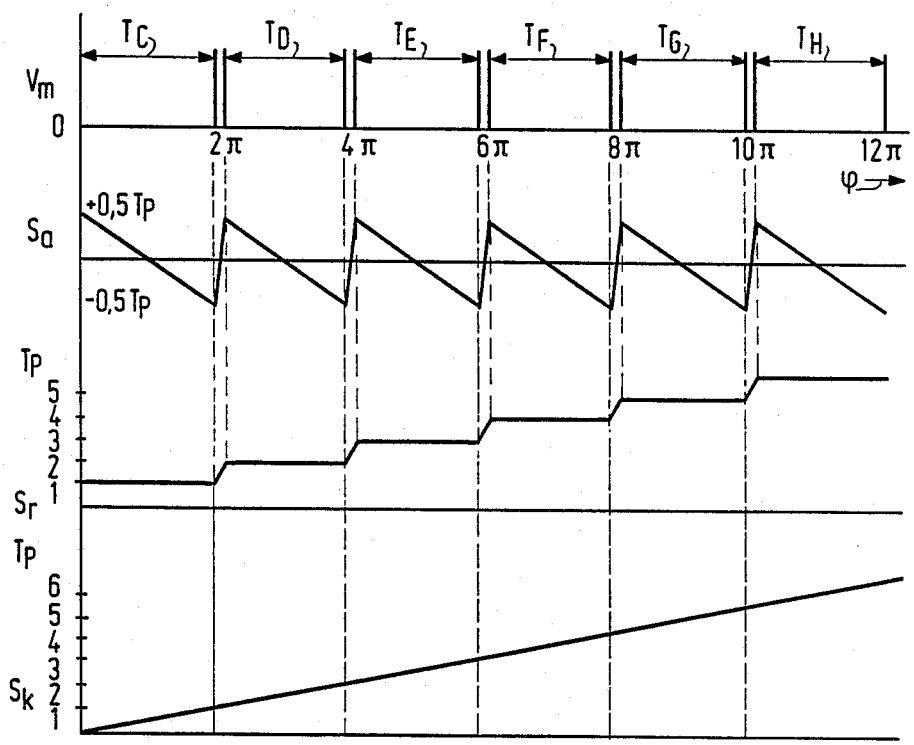

FIG. 4 shows the paths followed by the target point when the light-sensitive layer 5 is scanned along concentric rather than spiral tracks. FIG. 4a illustrates the associated variation of Sr, Sa and Sk as a function of $\phi$.

When concentric paths C, D, E, F, G and H are scanned the displacement component Sk is fully compensated for by the displacement component Sa, so that Sr remains constant during each revolution when concentric tracks are scanned. After every complete revolution of the carrier 4 the target point 20 is moved over a distance corresponding to the track pitch Tp by means of the deflection device 10. For the given variation of Sk the optical head is moved with a substantially constant velocity, resulting in a substantially vibration-free movement of the optical head. The velocity changes in the velocity of the radial motion of the target point are obtained by means of the acousto-optical deflection device 10, which is almost vibration-free, so that a very rapid and substantially vibration-free motion of the target point from one concentric track to the other is obtained, enabling the recording process to be started rapidly owing to tne absence of a waiting time after a displacement.

In the method of scanning the photoresist layer along concentric paths as described herein, the variation of Sk and the variation of Sa are such that the resulting velocities are proportional to the circumferential velocity of the carrier 4. It will be evident that Sa and Sk can be varied in numerous ways. In this respect it is merely important that the displacement of the target point proceeds in the desired manner and that the motion determined by Sk is a non-reversing and uniform motion. In this way an accurate and substantially vibration-free motion of the target point is then always guaranteed.

Figure 5:
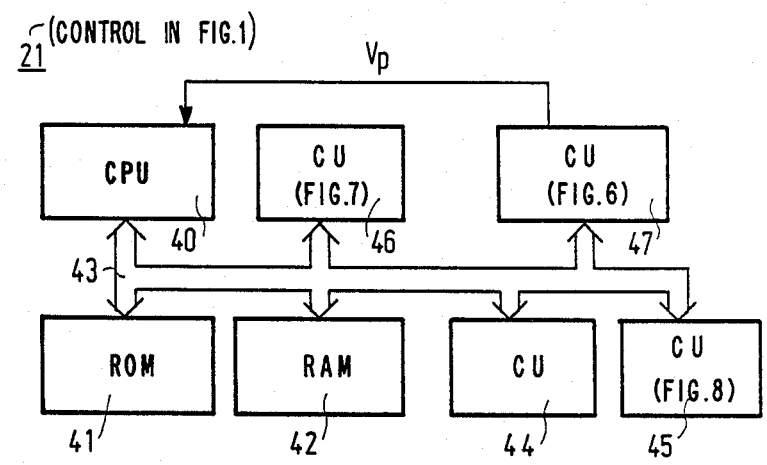
FIG. 5 shows an example of the control device of the optical write apparatus.

FIG. 5 shows a block diagram of the control device 21. The control device 21 comprises a programmable computing unit comprising a central processing unit 40 (CPU), a read-only memory 41 (ROM) and a random-access memory 42 (RAM). The memories 41 and 42 are connected to the central processing unit 40 in the customary manner via a bus 43. A control unit 44 for controlling the modulation generator 22, a control unit 45 for controlling the deflection device 10, a control unit 46 for controlling the positioning device 19, and a control unit 47 for controlling the drive means 3 are also coupled to the central processing unit 40 via the bus 43.

Figure 6:
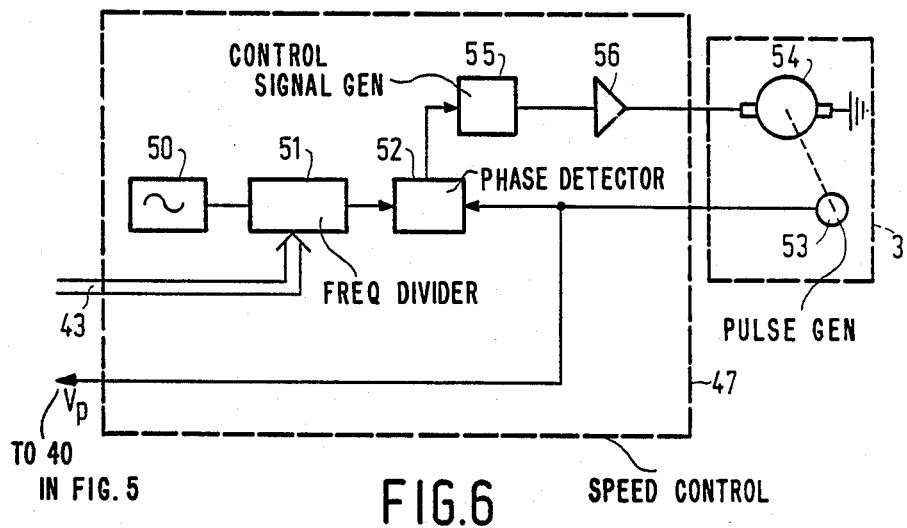
FIGS. 6, 7 and 8 show parts of the control device.

FIG. 6 shows the control unit 47 in detail. The control unit 47 comprises an oscillator 50 for generating clock pulses of constant frequency, which are applied to a frequency divider 51 of a programmable type, whose divisor is adjustable by the central processing unit 40 via the bus 43. The output of the divider 51 is applied to an input of a phase-detection circuit 52. The output signal of a pulse generator 53 is applied to the other input of the phase-detection circuit 52, which pulse generator is mounted on the shaft of a motor 54 for driving the turntable 2 and is constructed in such a way that it generates a pulse signal Vp of a frequency which is proportional to the speed of the motor 54. The output signal of the phase-detection circuit 52, which is representative of the phase difference between the signal on its inputs, is applied to a circuit 55 which, depending on the magnitude of the phase difference, generates a control signal which is applied to a power amplifier 56 for energizing the motor 54.

The phase-detection circuit 52, the control circuit 55, the amplifier 56, the motor 54, and the pulse generator 53 together constitute a phase-locked loop of a customary type for controlling the circumferential speed of the turntable 2 with a velocity which is proportional to the frequency of the output signal of the programmable frequency divider 51. The output signal Vp of the pulse generator 53 is applied to an input of the central processing unit 40 in FIG. 5.

Figure 7:
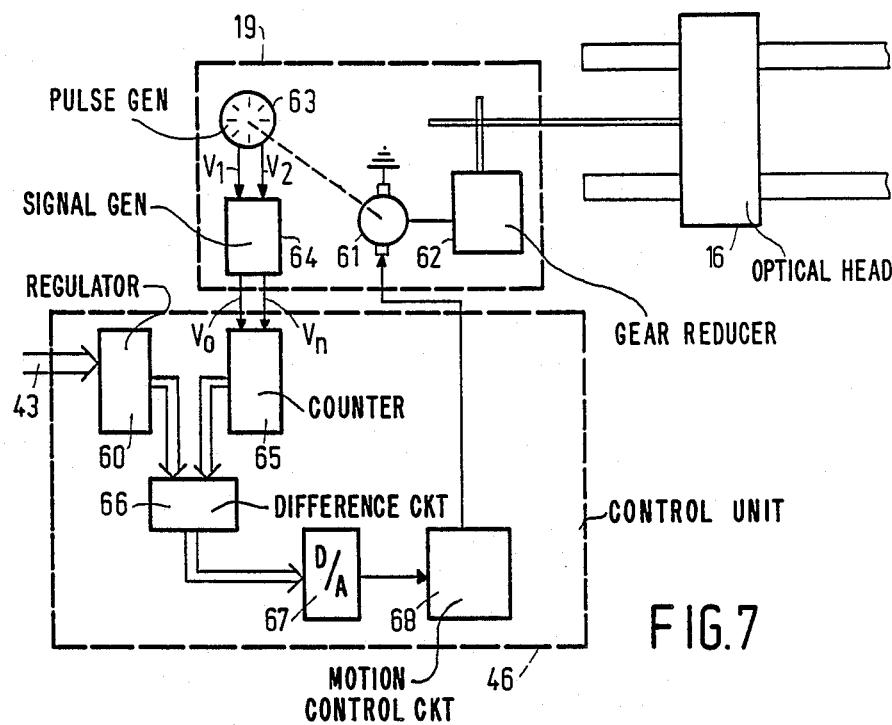

FIG. 7 shows an example of the control unit 46 for controlling the positioning device 19 in FIG. 1. The control unit 46 forms part of a control system for controlling the position of the optical head 16 in conformity with a desired value which in the form of a digital code can be loaded by means of the central processing unit 41 into a register 60 connected to the bus 43. The control system comprises a gear motor 61 for the moving the optical head 61 via a reduction mechanism 62. A pulse generator 63 is coupled to the shaft of the motor 61. The pulse generator 63 is of a type generating two pulse-shaped signals $V_1$ and $V_2$ which are 90° or 270° phase-shifted relative to each other depending on the direction of rotation of the motor and which have a frequency which is proportional to the speed of the motor 61. These signals $V_1$ and $V_2$ are applied to a circuit 64 which derives signals $V_o$ and $V_n$ from the signals $V_1$ and $V_2$ in such a way that pulses of $V_o$ are generated if the motor rotates in one direction and pulses of $V_n$ are generated if the motor rotates in the other direction.

The signals $V_o$ and $V_n$ are applied to respectively the count-up input and the count-down input of and up-/down counter 65. By means of a difference circuit 66 the count of the counter 65, which is a measure of the position of the optical head 16, is compared with the desired position stored in encoded form in the register 60. The output signal of the difference circuit is applied to a digital-to-analog converter 67. The output signal of the digital-to-analog converter 67 is applied to an input of a control circuit 68. The control circuit 68 derives such an energizing signal for the motor 71 from the output signal of the analog-to-digital converter 67 that the position of the optical head is in conformity with the desired values stored in tne register 60.

Figure 8:
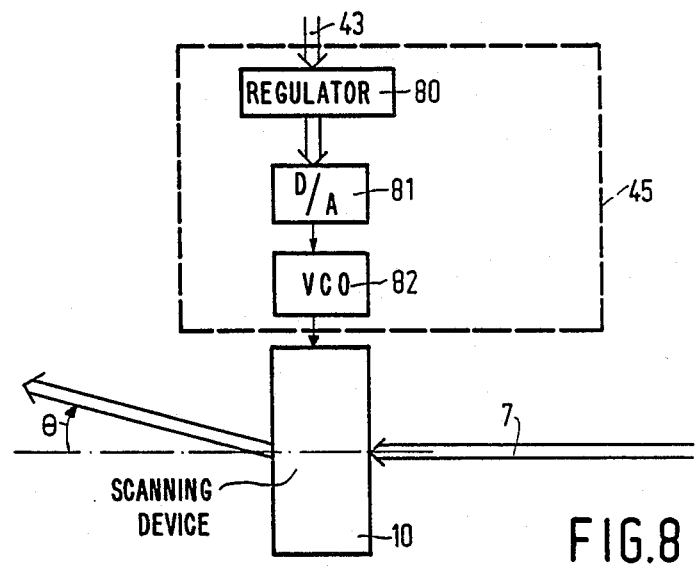

FIG. 8 shows an example of the control unit 45 in FIG. 5 for controlling the deflection device 10. The control circuit 45 comprises a register 80 into which a digital code can be loaded by the central processing means 40 via the bus 43. A digital-to-analog converter 81 converts the digital code into an analog signal which serves as a control signal for a voltage-controlled oscillator 82 of the customary type. The output signal of the oscillator 82 is applied to the control input of the acousto-optical deflection device 10 of a conventional type, a light beam 7 passed through the deflection device being deflected through an angle $\theta$ determined by the frequency of the signal on the control input.

By means of the control device described herein the angular velocity of the carrier, the radial displacement Sa of the target point 20 produced by the deflection device 10, and the radial displacement Sk of the target point produced by the positioning device 19 are controlled in conformity with a predetermined pattern during scanning of the photoresist layer 5. For this purpose the control device 21 is controlled by a program stored in the read-only memory 41. When this program is performed the central processing unit 40 determines the angular spacing $\phi$ by counting the number of pulses of the signal $V_p$ which it receives. Upon any variation of the number of pulses counted the central processing unit 40 adapts the contents of the registers 60 and 81 in order to bring the displacement Sa produced by the deflection device 10 and the displacement Sk produced by the positioning device 19 in conformity with the desired values corresponding to the specific angular spacing $\phi$, as is illustrated for example in FIGS. 2a, 3a and 4a. These desired values can be stored in one of the memories 41 or 42, for example in the form of a look-up table. However, if there is a simple relationship (as in FIGS. 2a, 3a and 4a) between the displacements Sa and Sk and the angular spacing $\phi$ the desired values can be computed simply by the central processing unit 40. The central processing unit 40 also controls the synchronisation of the modulation signal with the motion of the target point over the light-sensitive layer 51. As this synchronisation falls beyond the scope of the present invention, it will not be described in more detail.

The control device 21 described herein is constructed by means of a programmable computing unit. However, it will be evident that the control device can also be constructed by means of a "hard-wired" circuit.

One embodiment described herein employs an acusto-optical deflection device. It will be obvious to those skilled in the art that it is equally possible to utilize an electro-optical deflection device.

What is claimed is:

1. A method of scanning a plurality n ($n \geq 2$) of successive tracks for recording information on the surface of a rotating disc-shaped record carrier, such tracks having a predetermined pitch distance there-between, such method comprising directing a beam of radiation from an optical source to form a scanning spot on the record carrier and translating such spot in a forward radial direction thereon during rotation of the record carrier; such method being characterized in that it further comprises the steps of:
    (a) deflecting said beam so as to move said scanning spot a first predetermined distance in said forward radial direction on said record carrier for a period of time during a revolution thereof so as to scan a part of a track thereon;
    (b) deflecting said beam so as to move said scanning spot in a backward radial direction on said record carrier a second predetermined distance less than said first distance, thereby completing one period of reciprocating motion of said scanning spot during forward radial translation thereof, such period corresponding to "p" complete revolutions ($p \geq 1$) of said record carrier, said second distance being such that upon completion of one period of said reciprocating motion the scanning spot is positioned on a next succeeding track on said recording carrier;
    (c) repeating steps (a) and (b) so as to successively scan a part of each of said n tracks, said first and second distance being such that upon completing such scanning the scanning spot is then positioned on a next succeeding part of the initially scanned track; and
    (d) repeating steps (a)-(c) to successively scan a next succeeding part of all of said n tracks.

2. A method in accordance with claim 1, wherein the tracks on the surface of said carrier consist of n successive spiral tracks; said second predetermined distance is $1n^{th}$ of the pitch distance between such tracks, and the velocities of forward translation and forward deflection of said scanning spot are such taht the resulting composite velocity thereof during forward deflection is substantially proportional to the angular velocity of rotation of said record carrier during an uninterrupted time interval corresponding to q rotations thereof, q being an integer such that $q \leq p$.

3. A method in accordance with claim 2, wherein the forward translation and forward deflection velocities of said scanning spot are each substantially constant.

4. A method in accordance with claim 3, wherein forward radial deflection of said scanning spot during each period of reciprocatory deflection thereof is effected over a time interval corresponding to an integral number (including 1) of revolutions of said record carrier.

5. Apparatus for scanning a plurality n, where $n \geq 2$, of successive tracks on the surface of a rotating disc-shaped record carrier, such tracks having a predetermined pitch there-between, comprising:
    (a) an optical head for forming a beam or radiation into a scanning spot on said record carrier;
    (b) positioning means for moving said optical head so as to translate said scanning spot forward along a radial path on said record carrier during rotation thereof; and
    (c) means for deflecting said beam so as to cause said scanning spot to periodically deflect forward and in reverse along said radial translation path, each such period of forward and reverse deflection corresponding to p revolutions of said record carrier, p being an integer such that $p \geq 1$;
whereby said scanning spot successively scans a part of each of the successive tracks on said record carrier during the forward portion of successive periods of reciprocating deflection thereof, and is deflected to a succeeding part of the successive tracks during the reverse portion of such successive periods of reciprocating deflection.

6. Apparatus in accordance with claim 5, wherein the velocities of forward translation and forward deflection of said scanning spot are both constant and such that the resultant composite velocity of said scanning spot during forward deflection thereof is substantially proportional to the angular velocity of rotation of said record carrier.

7. Apparatus in accordance with either of claims 5 and 6, wherein the time interval of the forward deflection portion of each period of reciprocating deflection of said scanning spot is an integral number (including 1) of revolutions of said record carrier.

8. Apparatus in accordance with claim 5, wherein said deflection means is an acousto-optical deflection device.

9. Apparatus in accordance with claim 5, wherein said deflection means is an electro-optical deflection device.

* * * * *